United States Patent
Bonhôte et al.

(10) Patent No.: US 8,631,561 B2
(45) Date of Patent: Jan. 21, 2014

(54) METHOD FOR ELECTRICALLY CONNECTING AN ENERGY SOURCE TO A HEAD OF A DISK DRIVE

(75) Inventors: Christian René Bonhôte, Sunnyvale, CA (US); Linden James Crawforth, San Jose, CA (US); Toshiki Hirano, San Jose, CA (US); Fu-Ying Huang, San Jose, CA (US); Neil Leslie Robertson, Palo Alto, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 22 days.

(21) Appl. No.: 13/308,246

(22) Filed: Nov. 30, 2011

(65) Prior Publication Data
US 2013/0133182 A1    May 30, 2013

(51) Int. Cl.
*G11B 5/127* (2006.01)
*H04R 31/00* (2006.01)

(52) U.S. Cl.
USPC ....... 29/603.03; 29/603.07; 29/611; 360/121; 360/122; 360/245.3; 360/317; 360/324; 369/13.13; 369/13.14; 369/13.35

(58) Field of Classification Search
USPC ......... 29/592.1, 607.03, 610.1, 611; 360/121, 360/122, 245.3, 317, 324; 369/13.13, 369/13.14, 13.35, 13.33
See application file for complete search history.

(56) References Cited

U.S. PATENT DOCUMENTS

| | | | |
|---|---|---|---|
| 5,187,623 A | 2/1993 | Ibaraki | |
| 6,404,706 B1 | 6/2002 | Stovall et al. | |
| 7,254,885 B2 * | 8/2007 | Hipwell et al. | ............ 29/603.16 |
| 7,450,342 B2 | 11/2008 | White et al. | |
| 7,535,676 B2 | 5/2009 | Lille | |
| 7,538,978 B2 | 5/2009 | Sato et al. | |
| 7,804,655 B2 | 9/2010 | Shimazawa et al. | |
| 7,864,635 B2 | 1/2011 | Shimizu | |
| 7,921,436 B2 | 4/2011 | Shimizu et al. | |

(Continued)

FOREIGN PATENT DOCUMENTS

| | | |
|---|---|---|
| JP | 62073411 | 4/1987 |
| JP | 0732705 | 6/1995 |
| JP | 11120514 | 4/1999 |
| JP | 2011096857 | 5/2011 |

OTHER PUBLICATIONS

U.S. Appl. No. 13/308,348, entitled "Electrical Connection for a Laser Diode in a Tar Head", filed Nov. 30, 2011.

*Primary Examiner* — Paul D Kim
(74) *Attorney, Agent, or Firm* — Patterson & Sheridan, LLP

(57) ABSTRACT

The present invention generally relates to fabricating a bond pad for electrically connecting a laser diode to a slider and a TAR head in a HDD. The bond pad is deposited on a surface of the head that is perpendicular to the air bearing surface (ABS). The head is diced and lapped to expose the bond pad on a top surface of the head and mounted on a slider. The laser diode and a sub-mount may be coupled to the top surface of the slider—i.e., the surface opposite the ABS—by connecting to the bond pads. Specifically, both the laser diode and the sub-mount have electrodes thereon that are perpendicular to the bond pads. Conductive bonding material is used to bond the laser diode and the sub-mount to the bond pads.

7 Claims, 11 Drawing Sheets

(56) References Cited

U.S. PATENT DOCUMENTS

| | | | |
|---|---|---|---|
| 7,924,658 B2 * | 4/2011 | Shimazawa et al. | 369/13.14 |
| 8,374,061 B2 * | 2/2013 | Tanaka et al. | 369/13.33 |
| 8,411,535 B1 * | 4/2013 | Hirano et al. | 369/13.32 |
| 2005/0122630 A1 * | 6/2005 | Hipwell et al. | 360/294.5 |
| 2008/0316872 A1 | 12/2008 | Shimizu et al. | |
| 2009/0052078 A1 | 2/2009 | Tanaka et al. | |
| 2009/0195930 A1 | 8/2009 | Lille | |
| 2009/0225636 A1 | 9/2009 | Hirano et al. | |
| 2009/0266789 A1 | 10/2009 | Shimazawa et al. | |
| 2010/0097724 A1 | 4/2010 | Shimazawa et al. | |
| 2010/0238581 A1 | 9/2010 | Nakamura et al. | |
| 2010/0328807 A1 | 12/2010 | Snyder et al. | |
| 2011/0026156 A1 | 2/2011 | Shimazawa et al. | |
| 2011/0128827 A1 | 6/2011 | Shimazawa et al. | |
| 2011/0149698 A1 | 6/2011 | Naniwa et al. | |

* cited by examiner

METHOD FOR ELECTRICALLY CONNECTING AN ENERGY SOURCE TO A HEAD OF A DISK DRIVE

BACKGROUND OF THE INVENTION

1. Field of the Invention

Embodiments of the present invention generally relate to thermally assisted recording (TAR) enabled read/write head mounted on a slider in a hard disk drive (HDD).

2. Description of the Related Art

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" upon cooling the media to ambient temperatures. This technique is broadly referred to as TAR or thermally assisted magnetic recording (TAMR), energy assisted magnetic recording (EAMR), and heat-assisted magnetic recording (HAMR) which are used interchangeably herein. TAR can be applied to longitudinal and perpendicular recording systems as well as "bit patterned media". Heating of the media surface has been accomplished by a number of techniques such as focused laser beams or near-field optical sources.

SUMMARY OF THE INVENTION

The present invention generally relates to fabricating a bond pad on the top surface of a slider/head assembly that provides power to a top-mounted laser diode.

One embodiment of the invention discloses a method for forming a head of a disk drive. The method includes depositing a bond pad comprising a conductive material onto a surface of the head and depositing an insulating material onto the surface such that the bond pad is embedded in the insulating material. The method includes selectively removing the insulating material to expose a first surface of the bond pad and exposing a second surface of the bond pad. The method also includes electrically connecting the second surface of the bond pad to a laser diode.

Another embodiment of the invention discloses a method for forming a head of a disk drive. The method includes depositing a bond pad comprising a conductive material onto a surface of the head that has been patterned with photoresist and selectively removing the photoresist such that a spacer remains. The spacer contacts a first surface of the bond pad that is parallel to an air bearing surface of the head. The method also includes depositing an insulating material onto the surface such that the bond pad is embedded in the insulating material and selectively removing the insulating material to expose a second surface of the bond pad that is perpendicular to the air bearing surface. The method includes removing the spacer to expose the first surface of the bond pad. The method also includes electrically connecting the first surface of the bond pad to a laser diode.

Another embodiment of the invention discloses a method for forming a head of a disk drive. The method includes depositing an insulating layer onto the surface of the head, patterning photoresist onto the insulating layer, and depositing a bond pad comprising a conductive material onto the insulating layer with the pattern photoresist. The method also includes removing the photoresist to expose a first surface of the bond pad that is parallel to an air bearing surface of the head. The method includes electrically connecting the first surface of the bond pad to a laser diode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to fabricating a bond pad for electrically connecting an energy source (e.g., a laser or microwave-field source) to a slider/head assembly in a HDD. For simplicity, a laser diode will be discussed as the energy source; however, the invention is not limited to any particular type of laser or energy source. For example, other types of lasers that are contemplated herein include gas lasers, solid-state lasers, dye lasers, excimer lasers, and the like. The bond pad is deposited on a surface of the head that is perpendicular to the air bearing surface (ABS). The head is diced and lapped to expose a top surface of the bond pad. The head may be mounted on a slider to create the slider/head assembly. The laser diode and a sub-mount may be electrically and mechanically coupled to the top surface of the slider—i.e., the surface opposite the ABS—by connecting to the bond pads. Specifically, both the laser diode and the sub-mount may have electrodes thereon that are perpendicular to the bond pads. Conductive bonding material is used to not only bond the laser diode and the sub-mount to the bond pads, but also to electrically connect the bond pads to the electrodes. In one embodiment, a via (or trace) may be used to connect the bond pad to a head bonding pad that electrically connects the laser diode to a laser driver for powering the laser.

Figure 1A:
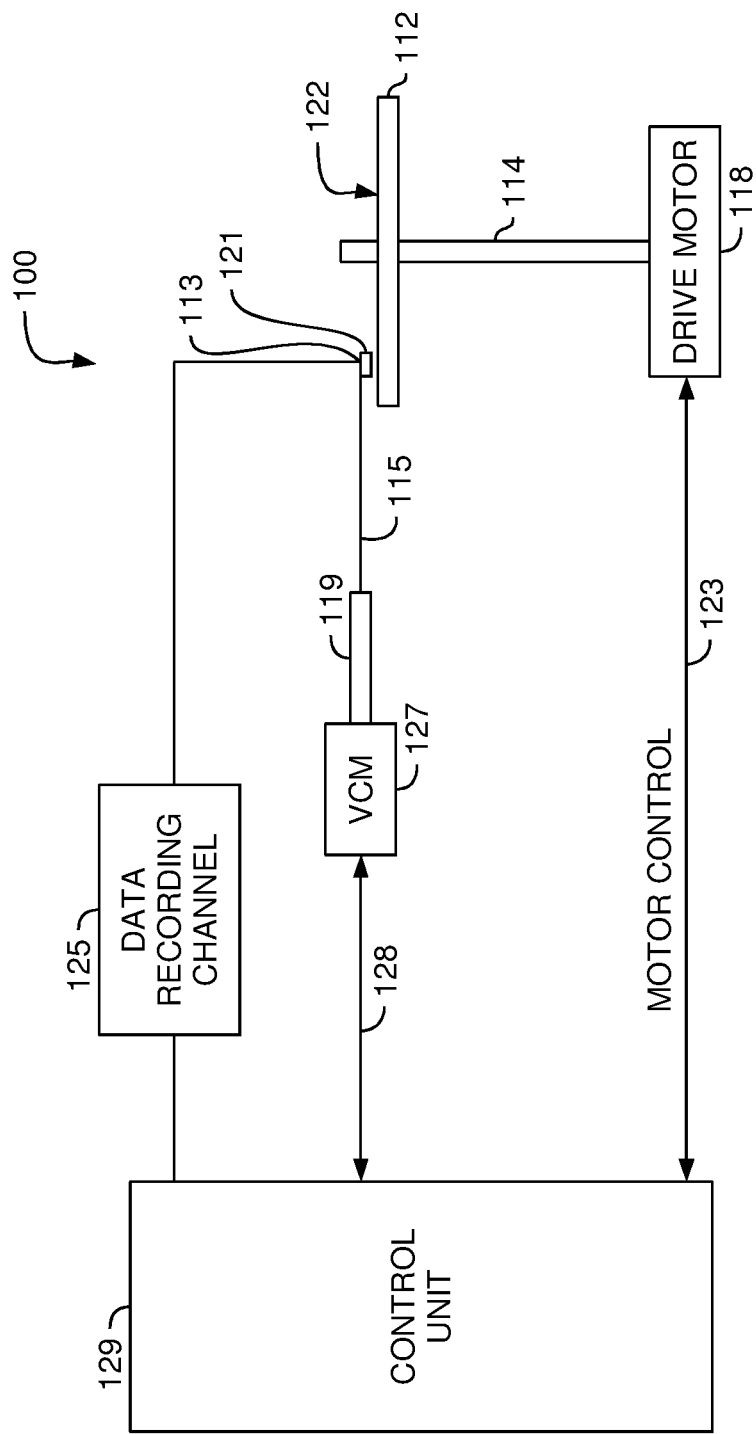
FIGS. 1A-1B illustrate a disk drive system, according to embodiments of the invention.

FIG. 1A illustrates a TAR enabled disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator 127. The actuator 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
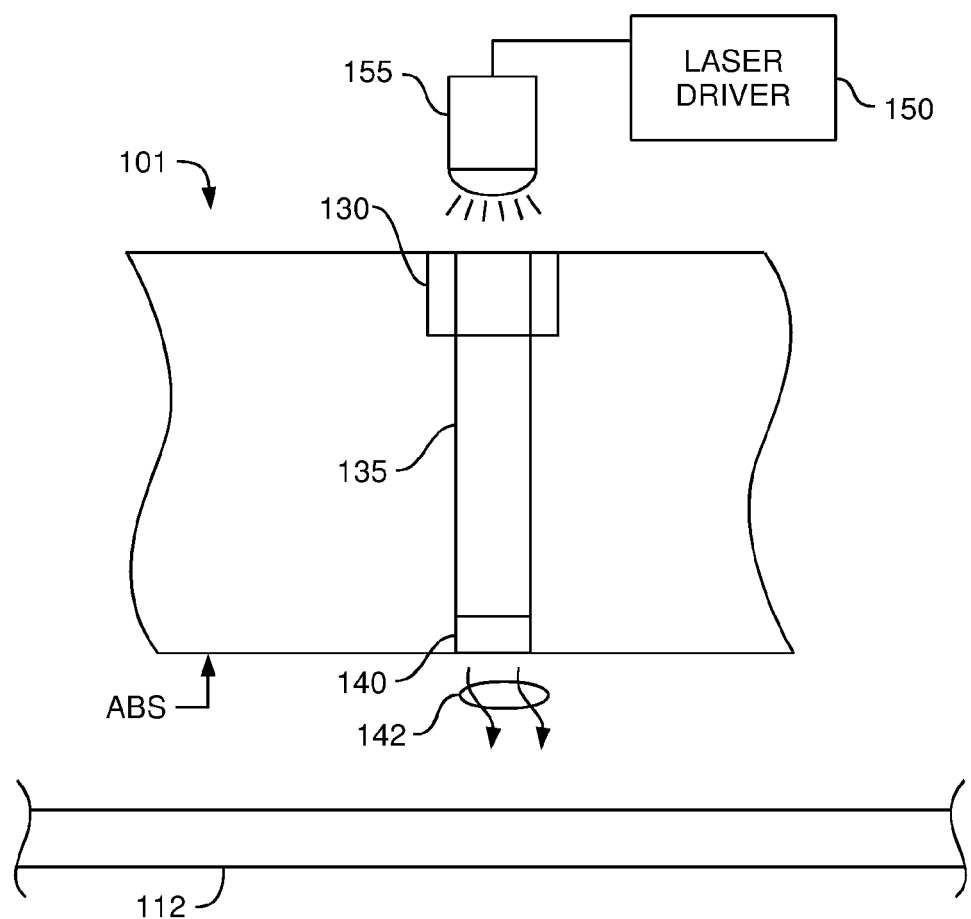

FIG. 1B is a cross sectional schematic of a TAR enabled write head, according to one embodiment of the invention. The head 101 is operatively attached to a laser 155 that is powered by a laser driver 150. The head 101 includes a spot-size converter 130 for focusing the radiation transmitted by the laser 155 into the waveguide 135. In another embodiment, the disk drive 100 may include one or more lens for focusing the beamspot of the laser 155 before the emitted radiation reaches the spot-size converter 130. The waveguide 135 is a channel that transmits the radiation through the height of the head 101 to the near-field transducer 140—e.g., a plasmonic device—which is located at or near the air-bearing surface (ABS). The near-field transducer 140 further focuses the beamspot to avoid heating neighboring tracks of data on the disk 112—i.e., creates a beamspot much smaller than the diffraction limit. As shown by arrows 142, this energy emits from the near-field transducer 140 to the surface of the disk 112 below the ABS of the head 101. The embodiments herein are not limited to any particular type of near-field transducer and may operate with, for example, either a c-aperture, e-antenna plasmonic near-field source, or any other shaped transducer known in the art.

Figure 2A:
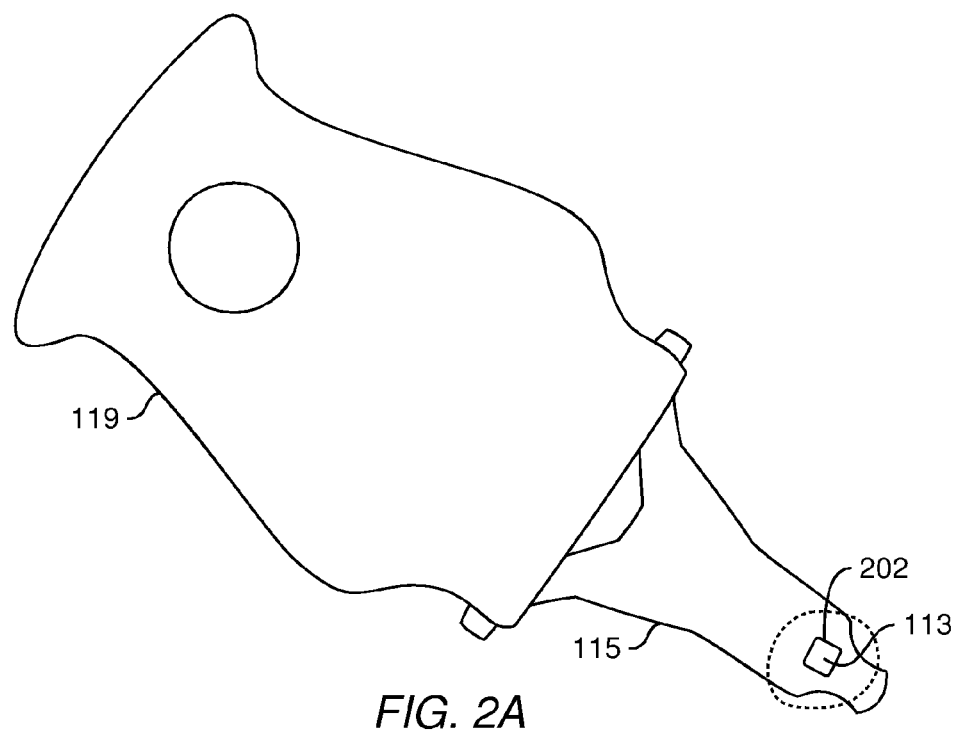
FIG. 2A is an isometric view of a suspension having a slider, laser diode and sub-mount coupled thereto.
Figure 2B:
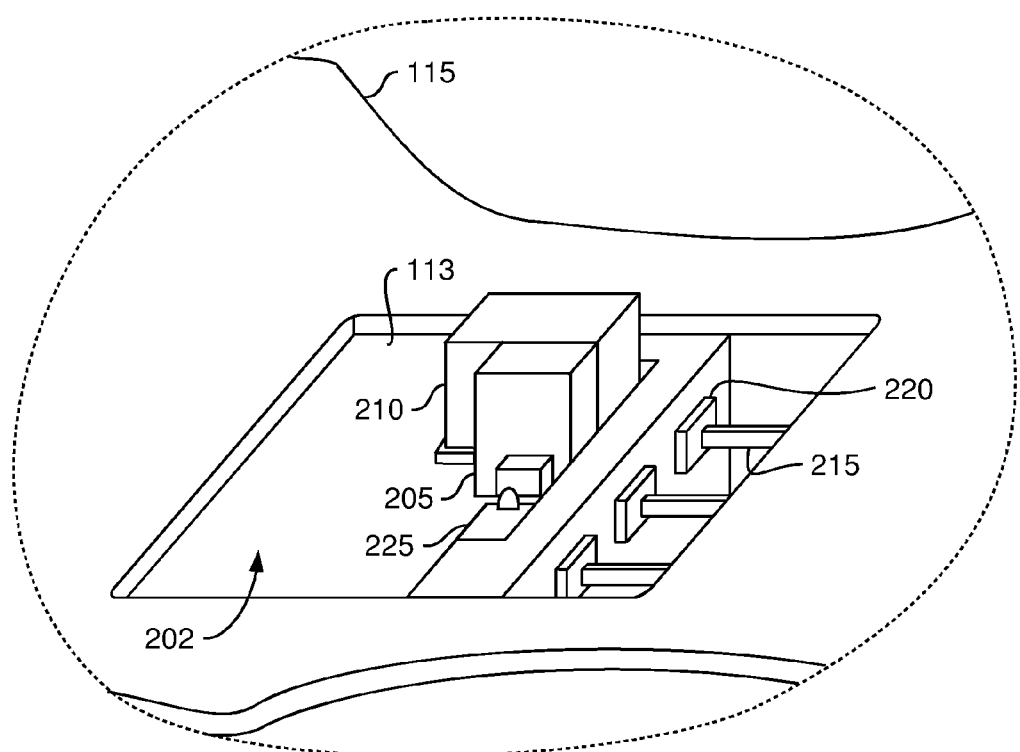
FIG. 2B is a close up view of FIG. 2A.

FIG. 2A is an isometric view of an actuator arm 119 and a suspension 115 having a slider 113 coupled thereto. FIG. 2B is a close up view of FIG. 2A. As shown in FIG. 2A, the suspension 115 includes an opening 202 by which a top surface of the slider 113 is exposed. The exploded view in FIG. 2B illustrates that power and/or data signals may be supplied to the head assembly coupled to the slider 113 using connectors 215. The connectors 215 are physically attached to the head bond pads 220 either directly, or indirectly using a conductive connecting material.

Figure 3A:
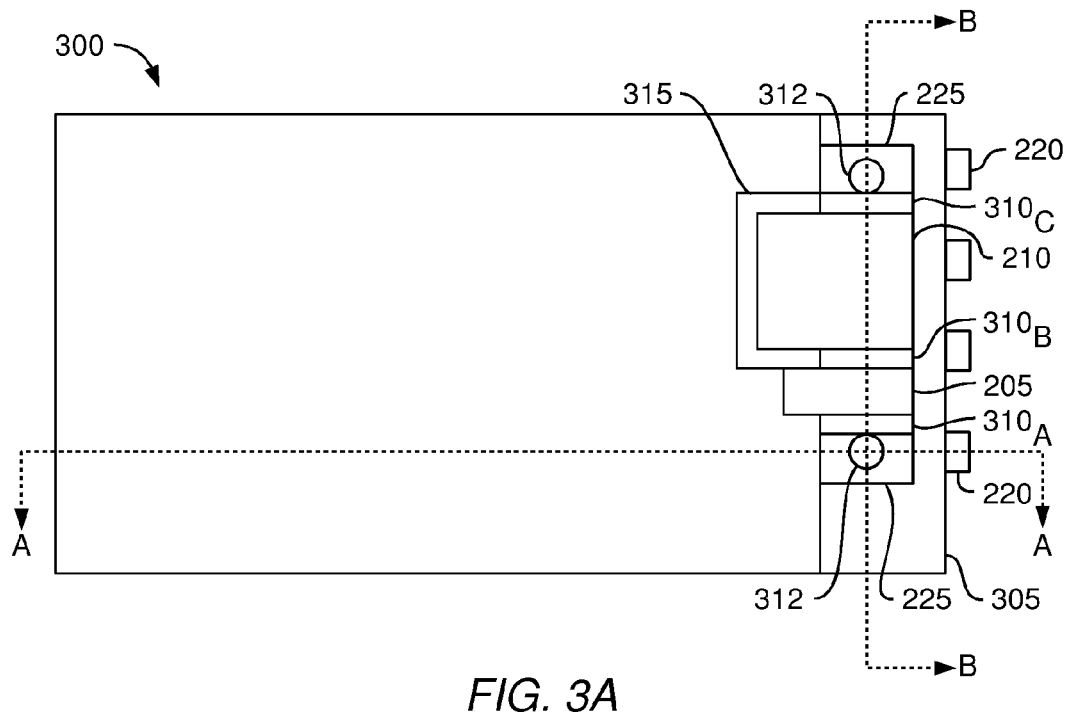
FIGS. 3A-3C are schematic top and cross-sectional views of a TAR head according to one embodiment of the invention.
Figure 3B:
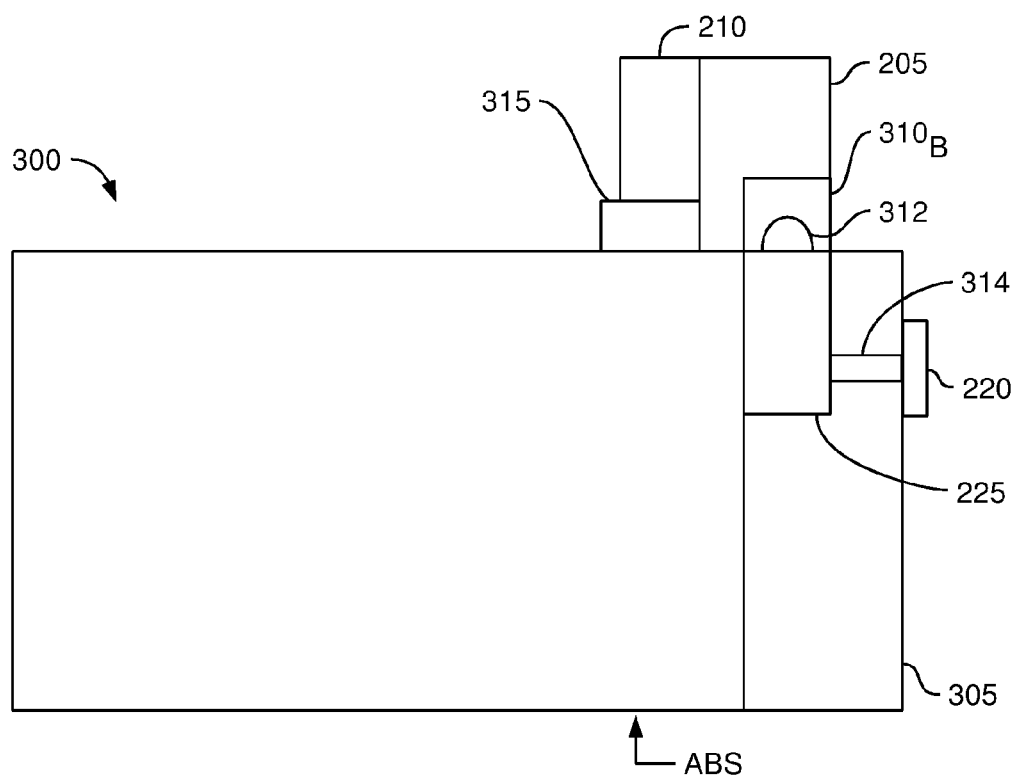
Figure 3C:
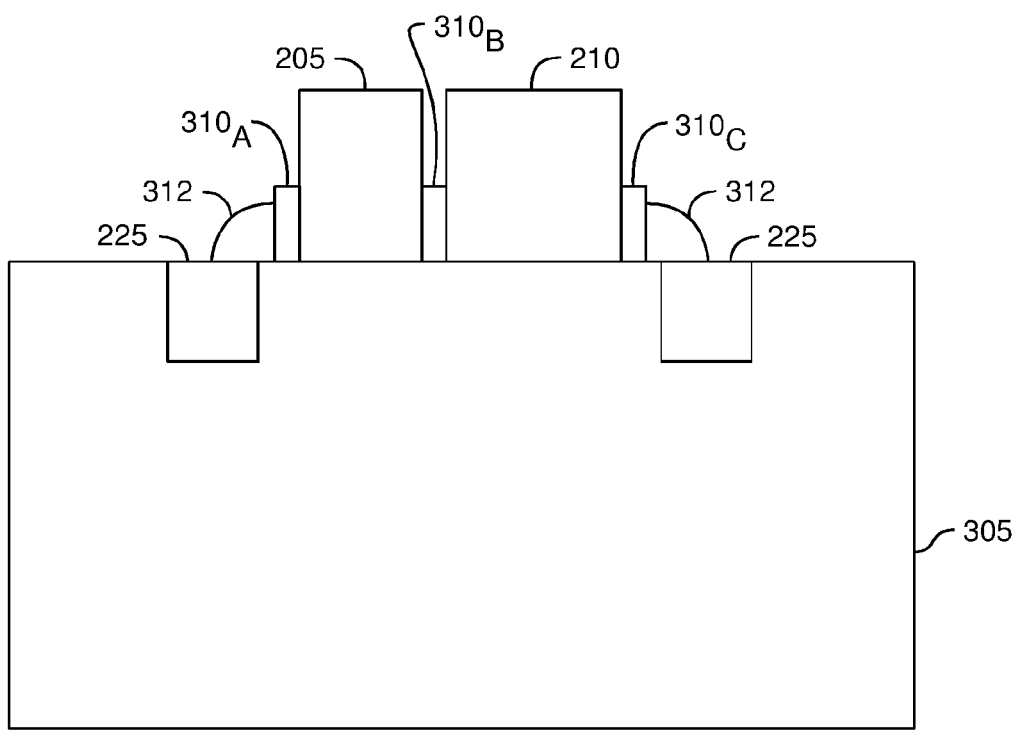

In one embodiment for performing TAR, a laser diode is attached on a slider with electrical connections for powering the laser diode. For a top mount laser diode, the laser diode is located on the top surface (i.e., the side opposite of the ABS) of the slider. FIGS. 3A-C are schematic top and cross-sectional views of a TAR head according to one embodiment of the present invention.

FIG. 3A is a schematic top view of a TAR slider/head assembly 300. Bond pads 225 are fabricated inside the thickness of the insulating layer 305 of the slider/head assembly 300 (i.e., the bond pads 225 embedded within the insulating material of the slider/head assembly 300). Suitable material that may be used for the insulating layer 305 includes alumina ($Al_2O_3$). The bond pads 225 are exposed through the top surface of the slider/head assembly 300. The electrodes $310_{a-c}$ for the laser diode 205 and sub-mount 210 are perpendicular to the top surface of the slider/head assembly 300 and also perpendicular to the exposed bond pads 225. The bottom surfaces of the laser diode 205 and the sub-mount 210 are each in contact with the slider/head assembly 300. In one embodiment, electrodes $310_a$ and $310_c$ are in contact with the bond pads 225. Alternatively, a portion of the insulating layer 305 may separate the electrodes $310_{a,c}$ from the bond pads. To ensure a good electrical connection to the bond pads 225, an electrically conductive material 312 is used to not only bond the bond pads 225 to the electrodes $310_{a,c}$, but also to permit electrical current to pass from the bond pads 225 to the electrodes $310_{a,c}$.

In one embodiment, electrode $310_c$ is connected to electrode $310_b$ using a trace 315. The trace 315 may be a conductive material (e.g., gold, copper, aluminum, etc.) and electrically connects the two electrodes $310_b$ and $310_c$. For example, the sub-mount 210 may be made of an insulating material, and thus, the trace 315 is needed to electrically connect the electrodes $310_{b,c}$. Although FIG. 3B shows the trace as a deposited conductive wire, the trace may be embedded into the substrate.

Alternatively, trace 315 and electrode $310_b$ may be omitted. In this embodiment, respective portions of sub-mount 210 and laser diode 205 may directly contact. Further, the sub-mount 210 may comprise an electrically conductive material that creates an electrical connection between electrode $310_c$ and the laser diode 205. In either embodiment, the bond pads 225 both provide electrical power to drive the laser diode 205.

For power to reach the bond pads 225, electrical current is delivered to the slider/head assembly 300 through head bond pads 220 which are coupled to the connectors 215 (not shown) which may be further connected to the laser driver 150 shown in FIG. 1B.

FIG. 3B is a cross-sectional view defined by line A-A of FIG. 3A. The head bond pads 220 are coupled to the bond pads 225 through a via 314. In the embodiment shown in FIGS. 3A and 3B, the via 314 is embedded within the insulating layer 305 of the slider/head assembly 300.

FIG. 3C is a cross-sectional view defined by line B-B of FIG. 3A. Although the sub-mount 210 and laser diode 205 are shown as being separated by the width of the electrode $310_b$, in one embodiment, the sub-mount 210 may extend over the electrode $310_b$ to physical connect to the laser diode 205 to provide further mechanical support to the diode 205. Moreover, as discussed earlier, in one embodiment, the bond pads 225 may directly contact the respective electrodes $310_{a,c}$ rather than being spaced apart by a portion of the insulating layer 305.

Figure 4A:
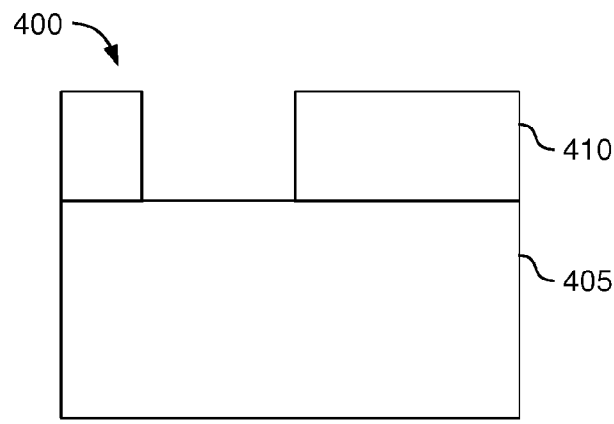
FIGS. 4A-4F illustrate a process for depositing a bond pad for electrically connecting a laser diode to a TAR enabled head, according to one embodiment.

FIGS. 4A-4F illustrate a process for depositing a bond pad for electrically connecting a laser diode to a TAR enabled head, according to one embodiment. FIG. 4A illustrates a substrate 405 and a patterned resist layer 410 that may be formed using any resist patterning process—e.g., a lithographic process. In one embodiment, the substrate 405 may include all the necessary components in a TAR head 400 such as a read and write pole, shield, write coil, waveguide, etc.— i.e., the TAR head 400 has previously been fabricated onto the substrate 405. Alternatively, the process shown in FIGS. 4A-F may occur before the TAR head 400 has been deposited onto the substrate 405. In either case, this invention is not limited to any particular type or process of fabricating a TAR head 400.

In another embodiment, the substrate 405 may include an insulating layer (e.g., alumina) that has been deposited and lapped before the patterned resist layer 410 is deposited onto the substrate 405.

Figure 4B:
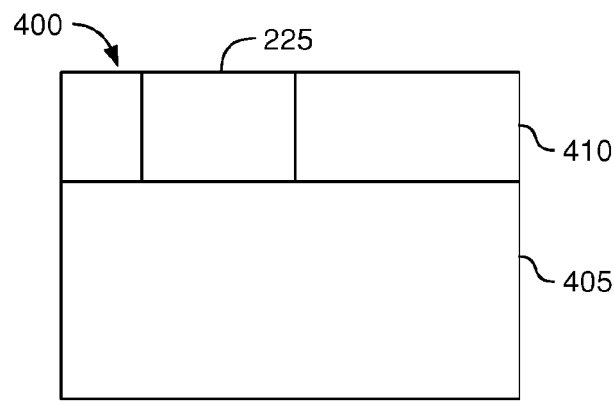

In FIG. 4B, the bond pad 225 is deposited into the patterned resist layer 410. For example, electroplating may be used to deposit a conductive material (e.g., gold or copper) to form the bond pad 225. In one embodiment, gold is deposited as the bond pad 225 material to benefit from its lack of a naturally occurring oxide film which may hinder the electrical connection or impede the ability of solder connective material 312 to wick to the bond pad 225. Nonetheless, any electrically conductive material is contemplated as being within the scope of this invention.

In one embodiment, the height of the bond pad 225 (i.e., the direction perpendicular to the top surface of the substrate 405) is approximately 30 μm.

Figure 4C:
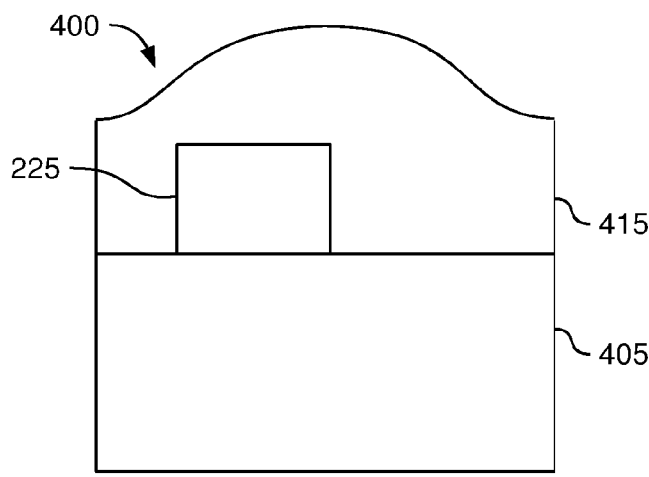

In FIG. 4C, the resist layer 410 is removed and an insulating material 415 is deposited. In one embodiment, the insulating material 415 is alumina. Moreover, the insulating material may be the same insulating layer 305 that is shown in FIGS. 3A-C.

Figure 4D:
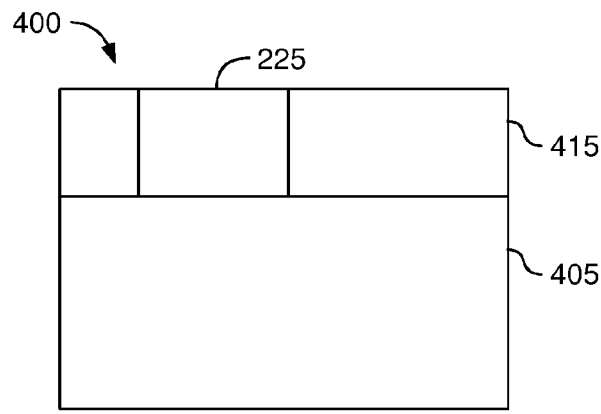

In FIG. 4D the insulating material 415 is removed using a lapping process (such as chemical mechanical polishing (CMP)) to expose a surface of the bond pad 225 that is perpendicular to the ABS.

Figure 4E:
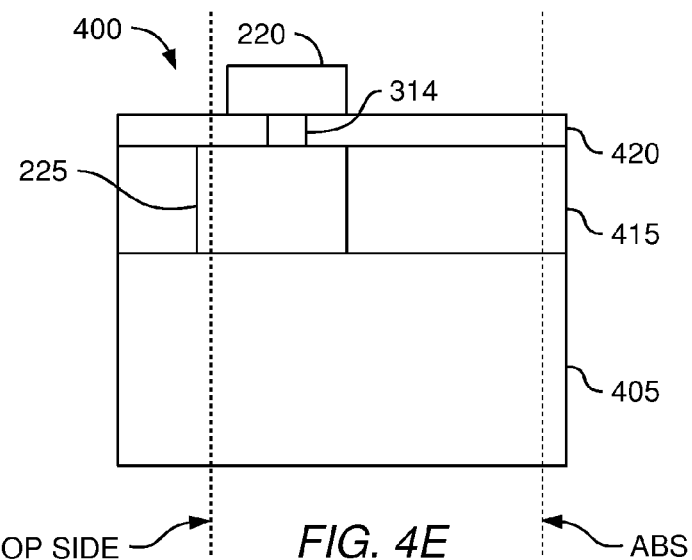

FIG. 4E illustrates creating a via 314 filled with an electrically conductive material and depositing a head bond pad 220 that is electrically connected to the bond pad 225 through the via 314. Specifically, in one or more process steps, an additional insulating material 420, the conductive material in the via 314, and the head bonding pad 220 may be deposited on top of the substrate 405. In one embodiment, the bond pad 225, via 314, and head bond pad 220 may comprise of the same conductive element—e.g., gold. Further the additional insulating material 420 may comprise of the same insulator as insulating material 415—e.g., alumina. The dotted lines represent the portions of the head 400 that are removed by dicing and/or lapping. For example, the dotted line labeled as the top side illustrates that a dicing saw may be used to cut off the portion of the head 400 that is to the left of the dotted line. Because the dicing saw may create imperfections, lapping (e.g., CMP) may be used to finish the top side of the head 400. Similarly, the dotted line for the ABS illustrates that the ABS for the head 400 may also be formed. Note that FIGS. 4A-F are not drawn to scale. Further, there may be a plurality of elements separating the bond pad 225 from the ABS which are omitted from the figures.

Notably, if the other components of the head 400 have not yet been laminated or deposited onto the substrate 405, those components would be added before dicing and lapping to create the ABS.

Figure 4F:
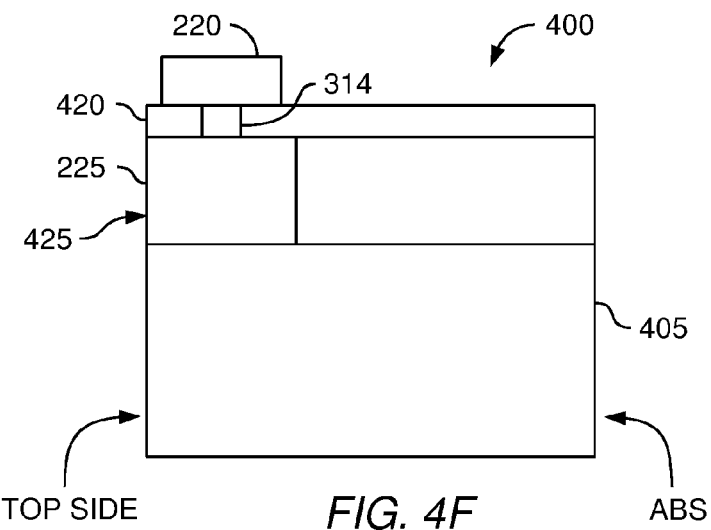

FIG. 4F illustrates a bond pad 225 with a finished top surface 425 which then may be used to electrically connect the laser diode 205 to the head 400 in a manner illustrated in FIGS. 3A-C. That is, the laser diode 205 may be placed on the top surface 425 and conductive material 312 may be used to electrically connect the bond pad 225 to the laser diode 205.

In one embodiment, the thickness of the bond pad 225 (i.e., the direction perpendicular to the ABS) is between approximately 20 to 30 μm.

Figure 5A:
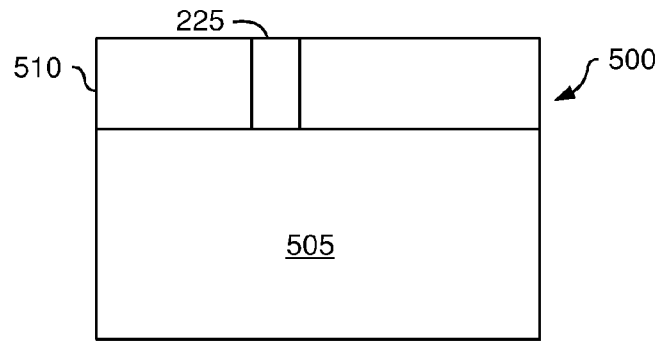
FIGS. 5A-5G illustrate a process for depositing a bond pad for electrically connecting a laser diode to a TAR enabled head, according to one embodiment.

FIGS. 5A-G illustrate a process for depositing a bond pad for electrically connecting a laser diode to a TAR head, according to one embodiment. FIG. 5A illustrates a head 500 that is similar to the head 400 illustrated in FIG. 4B—i.e., a bond pad 225 deposited within a patterned resist layer 510 on a substrate 505. The bond pad 225 and resist layer 510 may comprise of the same materials and dimensions as those disclosed in regards to FIGS. 4A-F. Similarly, the other components of the head 500 (i.e., read/write pole, shields, waveguides, etc.) may have already been deposited onto the substrate 505.

Figure 5B:
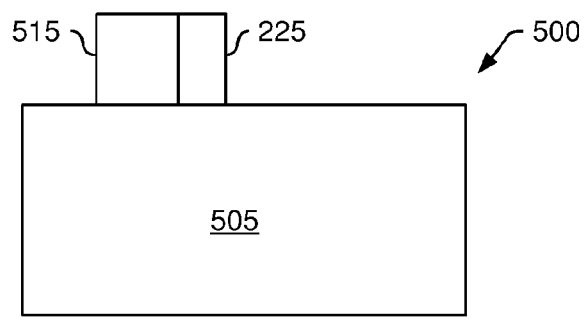

In FIG. 5B, not all of the resist material 510 is removed, but instead a spacer 515 of resist material remains on the substrate 505.

Figure 5C:
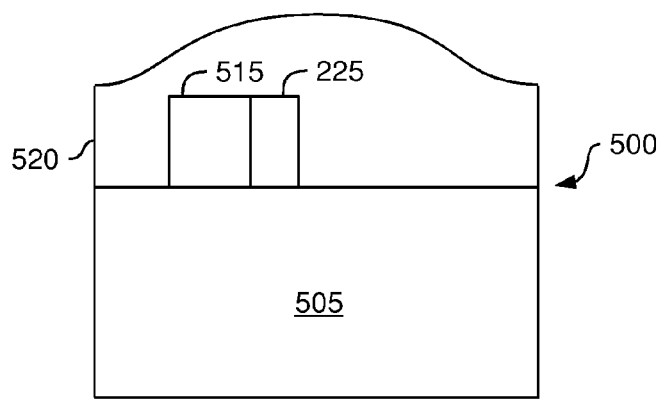

In FIG. 5C, an insulating material 520 (e.g., alumina) is deposited over the spacer 515 and bond pad 225.

Figure 5D:
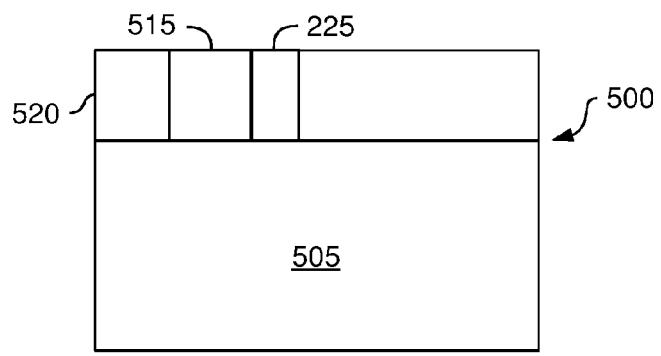

In FIG. 5D, the insulating material 520 is removed by, for example, lapping to expose a surface of the bond pad 225.

Figure 5E:
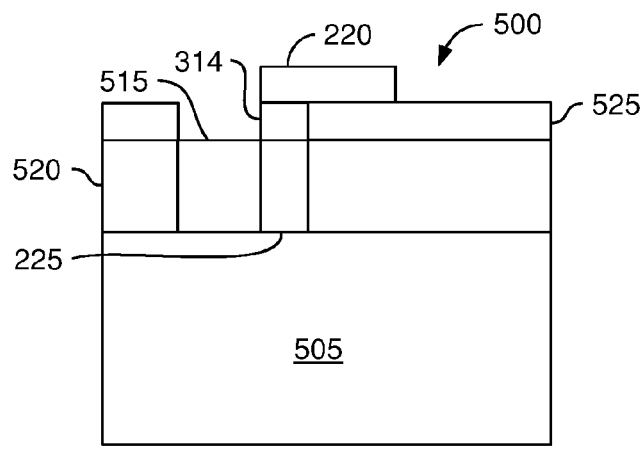

In FIG. 5E, an additional insulating material 525, via 314, and head bond pad 220 are deposited onto the substrate 505 in one or more processing steps.

Figure 5F:
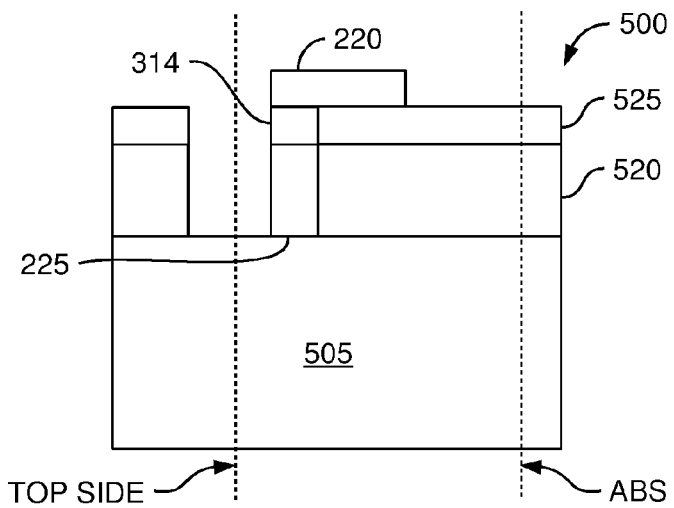

In FIG. 5F, the spacer 515 is selectively removed from the substrate. For example, a solvent may be used which breaks up the resist material of the spacer 515 but does not affect the other materials of the head 500.

Similar to FIG. 4F, the top side and the ABS of the head 500 may be formed by dicing and lapping as shown by the dotted lines. However, unlike in FIG. 4F, the top side of the bond pad 225 in the head 500 is not diced or lapped. That is, the saw blade does not pass through the bond pad 225.

Alternatively, the top side of the head 500 may be diced with the spacer 515 still deposited on the head 500—i.e., the saw blade passes through the spacer 515. The remnants of the spacer 515 (if any) may be removed by a solvent in a later processing step.

Figure 5G:
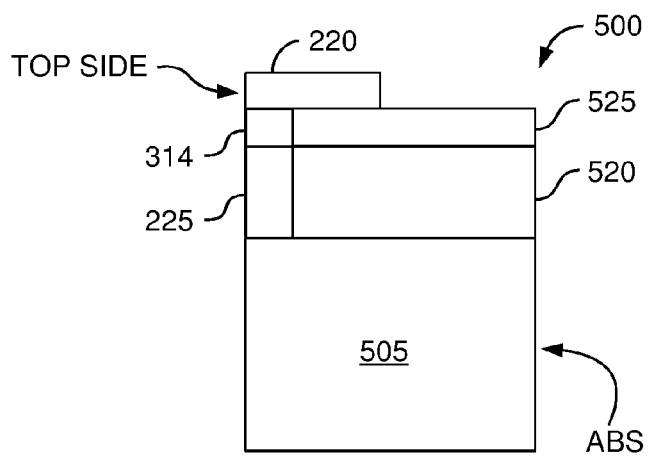

As shown in FIG. 5G, a top side portion comprising the bond pad 225 is slightly recessed (e.g., 1-10 μm) relative to the other portions of the top side. This occurs because the head 500 was diced and lapped at a distance away from the bond pad 225. This may help when electrically connecting the top side of the bond pad 225 to the laser diode 205 to ensure a smooth surface relative to a surface that has been diced and/or lapped.

Figure 6A:
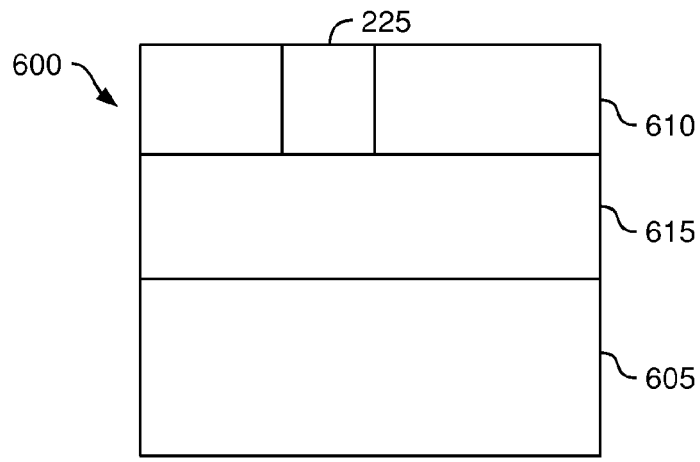
FIGS. 6A-6C illustrate a process for depositing a bond pad for electrically connecting a laser diode to a TAR enabled head, according to one embodiment.
Figure 6B:
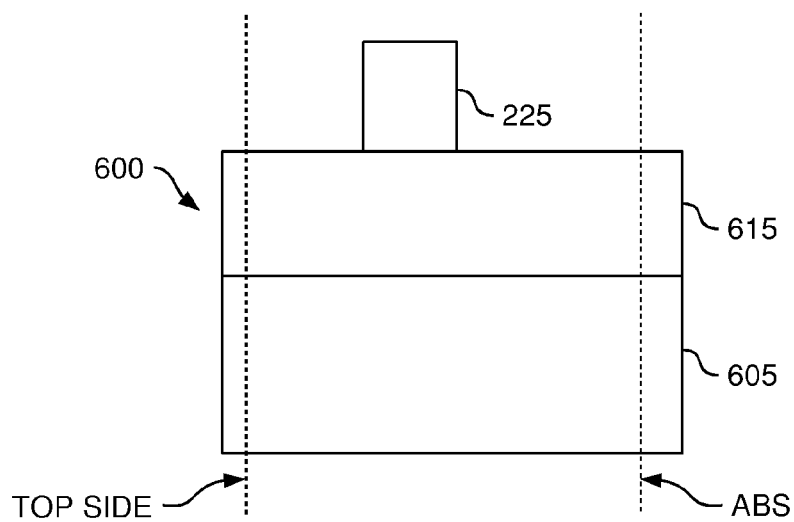
Figure 6C:
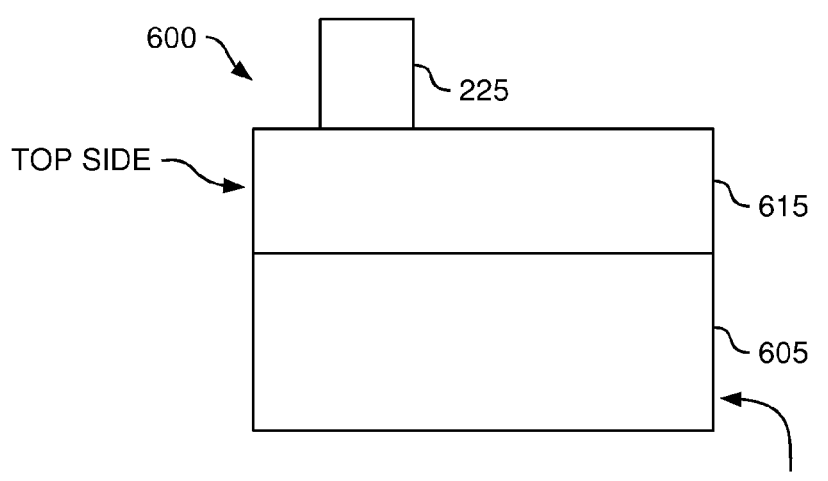

FIGS. 6A-C illustrate a process for depositing a bond pad for electrically connecting a laser diode to a TAR head, according to one embodiment. FIG. 6A illustrates a head 600 that is similar to the head 400 illustrated in FIG. 4B—i.e., a bond pad 225 deposited within a resist layer 610 on a substrate 605. Moreover, the same dimensions and materials that make up the respective layers in FIG. 4B may be used in head 600. However, head 600 also includes an insulating layer 615 (e.g., alumina) deposited between the substrate 605 and bond pad 225 which may or may not be used in the techniques shown in FIGS. 4A-F and 5A-G.

In FIG. 6B, the resist layer 610 is removed and the head 600 is diced and lapped to form the top side and the ABS as shown by the dotted lines. Similar to the processes shown in FIGS. 4A-F and 5A-G, the other components of the head 600 may have been deposited onto the substrate either before or after the bond pad 225 has been deposited.

FIG. 6C shows the head 600 with a finished top side and ABS. Similar to FIG. 5A-G, this technique avoids have to directly dice and/or lap the bond pad 225.

Figure 7:
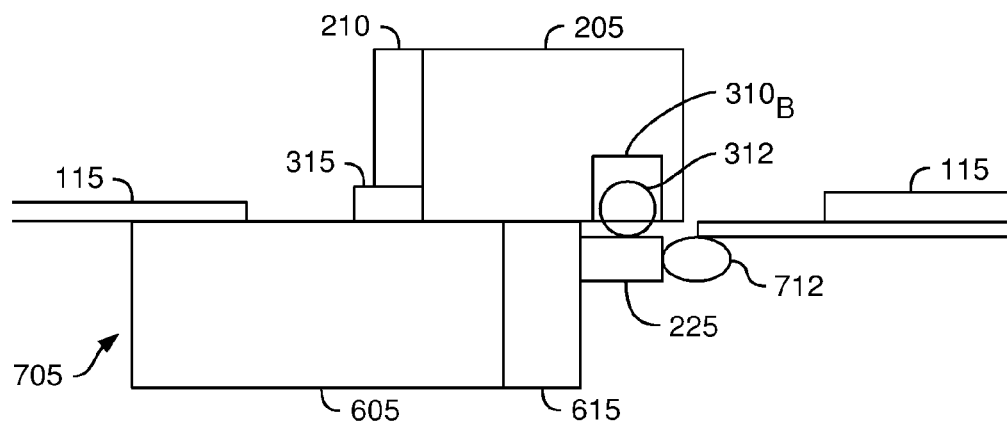
FIG. 7 is a schematic side view of a TAR head made by the technique illustrated in FIGS. 6A-6C, according to one embodiment.

FIG. 7 is a schematic side view of a TAR head made by the technique illustrated in FIGS. 6A-6B, according to one embodiment. After the bond pad 225 has been formed on the substrate 605, the head 600 may be attached to the slider to create a slider/head assembly 705. This assembly 705 may then be attached to suspension 115. Moreover, either before or after attaching the head 600 to the suspension 115 or slider, the laser diode 205 may be electrically connected to the bond pad 225 using the connective material 312. Further, the laser 205 and sub-mount 210 may be connected to the bond pads 225 in the same process step of attaching the bond pads 225 (or head bond pads) to the connectors 215.

In contrast to FIGS. 3A-C, instead of using head bond pads to connect to the connectors 215, the bond pads 225 may use connective material 712 (e.g., solder or a conductive epoxy) to couple to the connectors 215 (i.e., a conductive wire) without using head bond pads. That is, in one embodiment, the bond pads 225 may be used as the head bond pads for a slider.

By using the techniques discussed above, the head bond pads found in many typical HDDs may used to also provide power to a laser diode mounted on a top surface of the assembly.

While the foregoing is directed to embodiments of the present invention, other and further embodiments of the invention may be devised without departing from the basic scope thereof, and the scope thereof is determined by the claims that follow.

What is claimed is:

1. A method for electrically connecting an energy source to a head of a disk drive, comprising:
    depositing a conductive bond pad onto a surface of the head;
    depositing an insulating material onto the surface such that the bond pad is embedded in the insulating material;
    selectively removing the insulating material to expose a first surface of the bond pad;
    after exposing the first surface, exposing a second surface of the bond pad; and
    applying a conductive material on the second surface of the bond pad to electrically connect the second surface to the energy source, the bond pad is configured to provide, via the conductive material, an electrical signal for driving the energy source to heat a magnetic media.

2. The method of claim 1, wherein exposing the second surface of the bond pad further comprises dicing the head such that a saw blade passes through the bond pad, wherein the second surface is parallel to an air bearing surface of the head.

3. The method of claim 1, wherein the energy source is mounted on a top surface of the head that is parallel to the second surface of the bond pad.

4. The method of claim 3,
    applying a conductive material on the second surface of the bond pad to
    wherein the electrode is substantially perpendicular to the top surface of the head.

5. The method of claim 1, wherein the bond pad is at least 20 microns wide in a direction perpendicular to the surface of the head on which the bond pad was deposited and between 10-40 microns thick in a direction perpendicular to the air bearing surface.

6. A method for electrically connecting an energy source to a head of a disk drive, comprising:
    depositing a conductive bond pad onto a surface of the head;
    depositing an insulating material onto the surface such that the bond pad is embedded in the insulating material;
    selectively removing the insulating material to expose a first surface of the bond pad;
    after selectively removing the insulating material, depositing a conductive material into a via that contacts the bond pad;
    depositing a head bond pad, wherein the conductive material in the via electrically connects the head bond pad to the bond pad;
    exposing a second surface of the bond pad; and
    electrically connecting the second surface of the bond pad to the energy source.

7. The method of claim 6, further comprising:
    electrically connecting the head bond pad to a circuit driver that powers the energy source.

* * * * *

UNITED STATES PATENT AND TRADEMARK OFFICE
CERTIFICATE OF CORRECTION

| | |
|---|---|
| PATENT NO. | : 8,631,561 B2 |
| APPLICATION NO. | : 13/308246 |
| DATED | : January 21, 2014 |
| INVENTOR(S) | : Bonhôte et al. |

It is certified that error appears in the above-identified patent and that said Letters Patent is hereby corrected as shown below:

In the Claims:

Column 8, Claim 4, Lines 36-37, please delete "applying a conductive material on the second surface of the bond pad to".

Signed and Sealed this
Twenty-fourth Day of June, 2014

Michelle K. Lee
*Deputy Director of the United States Patent and Trademark Office*